United States Patent Office 3,319,762
Patented May 16, 1967

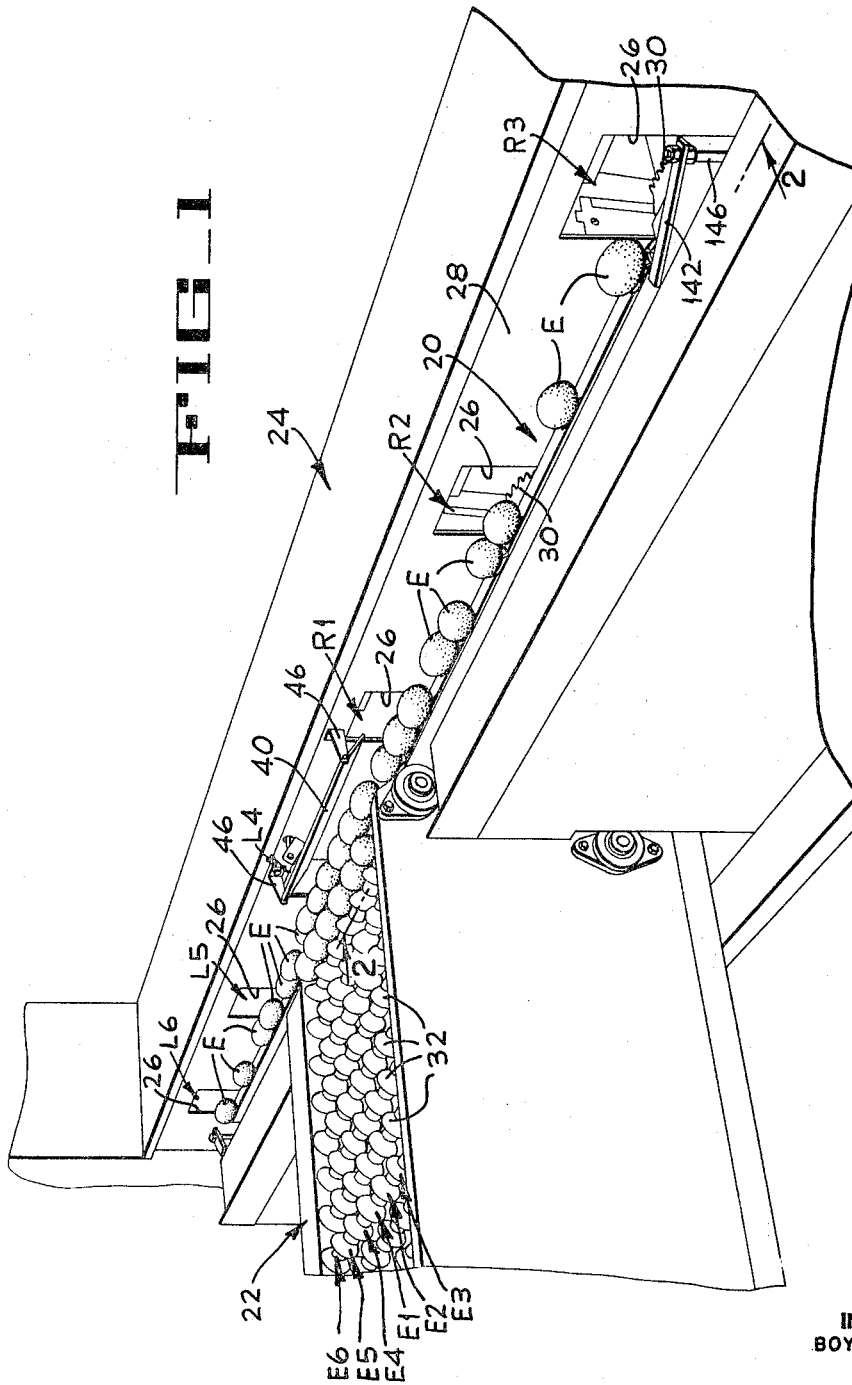

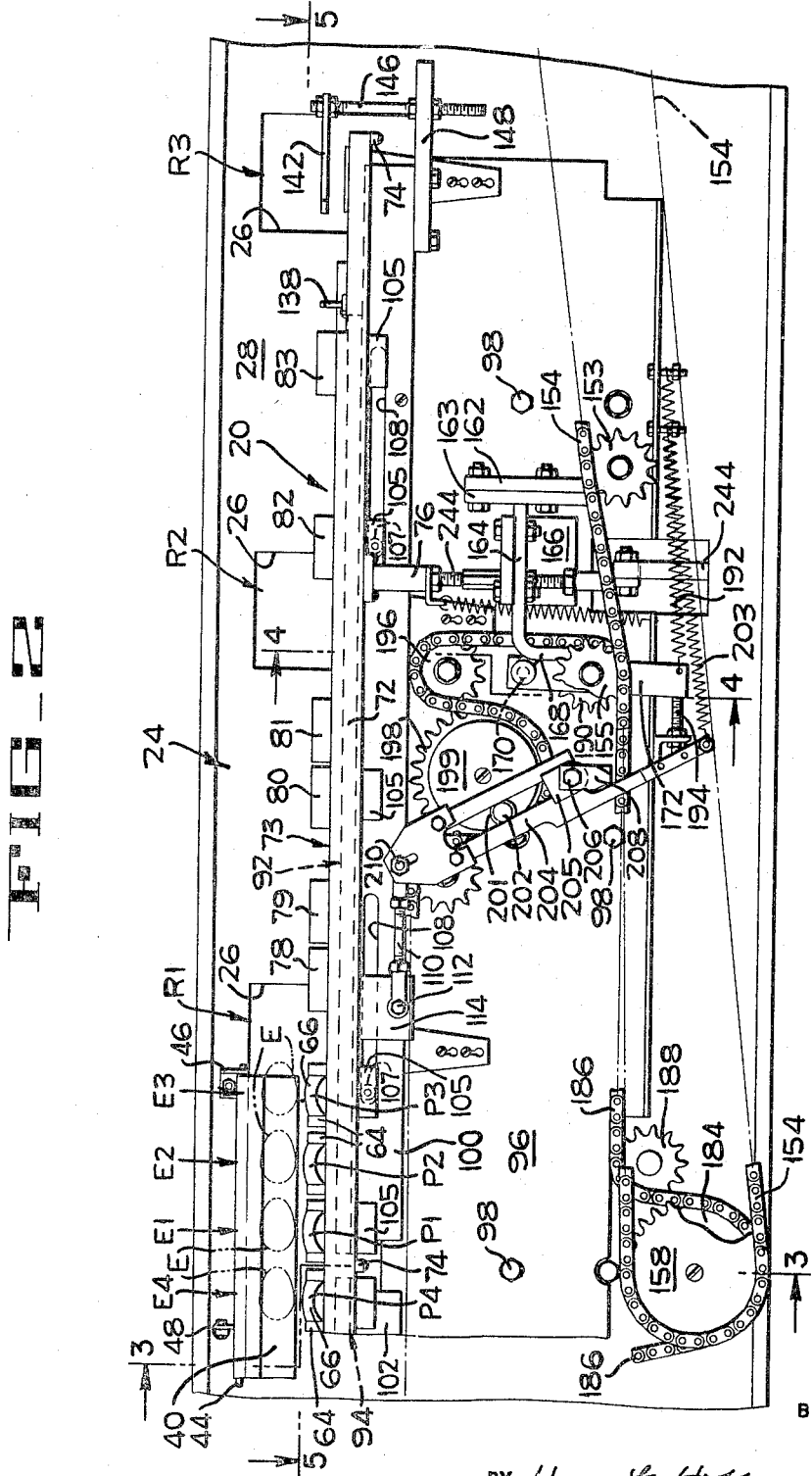

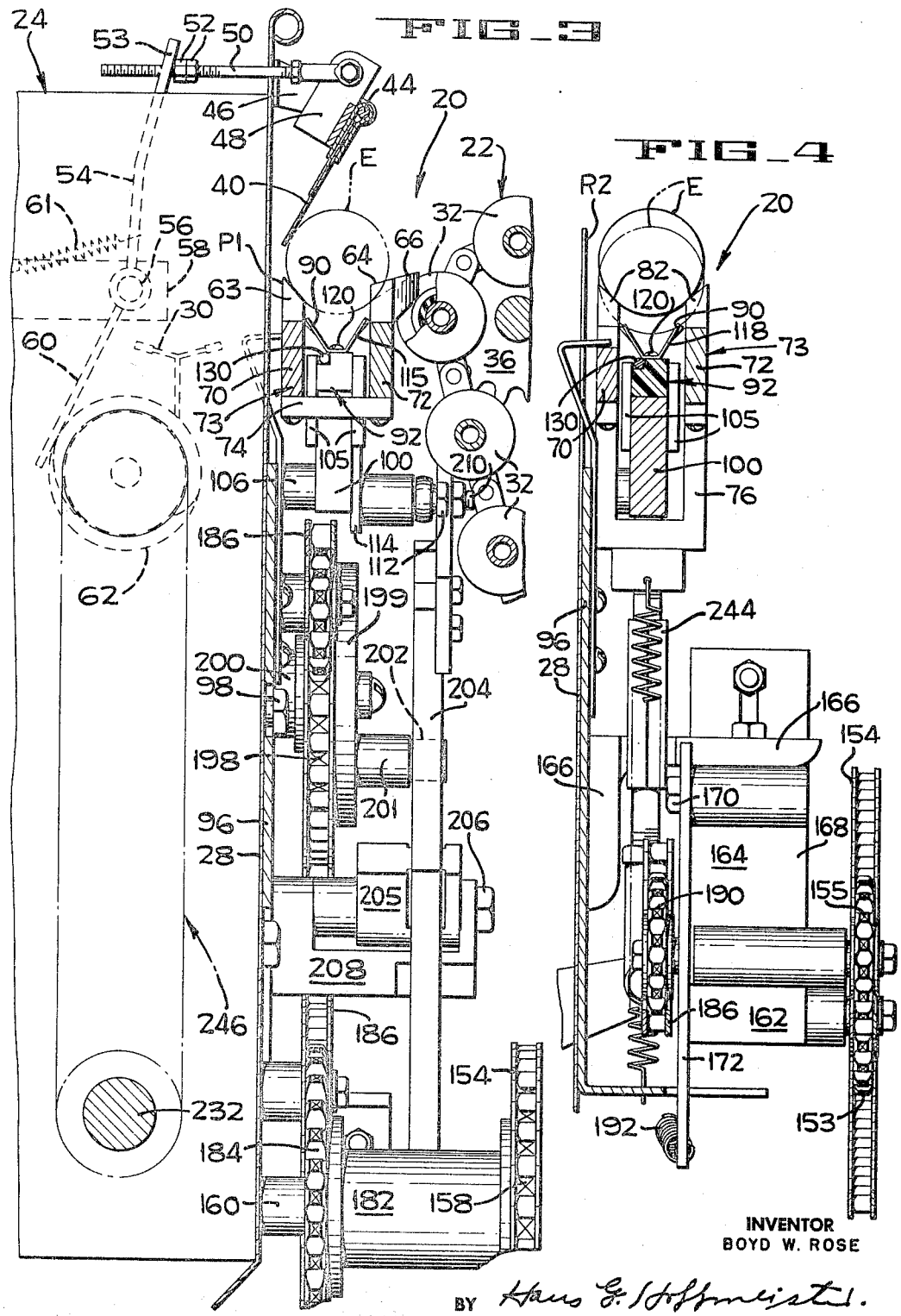

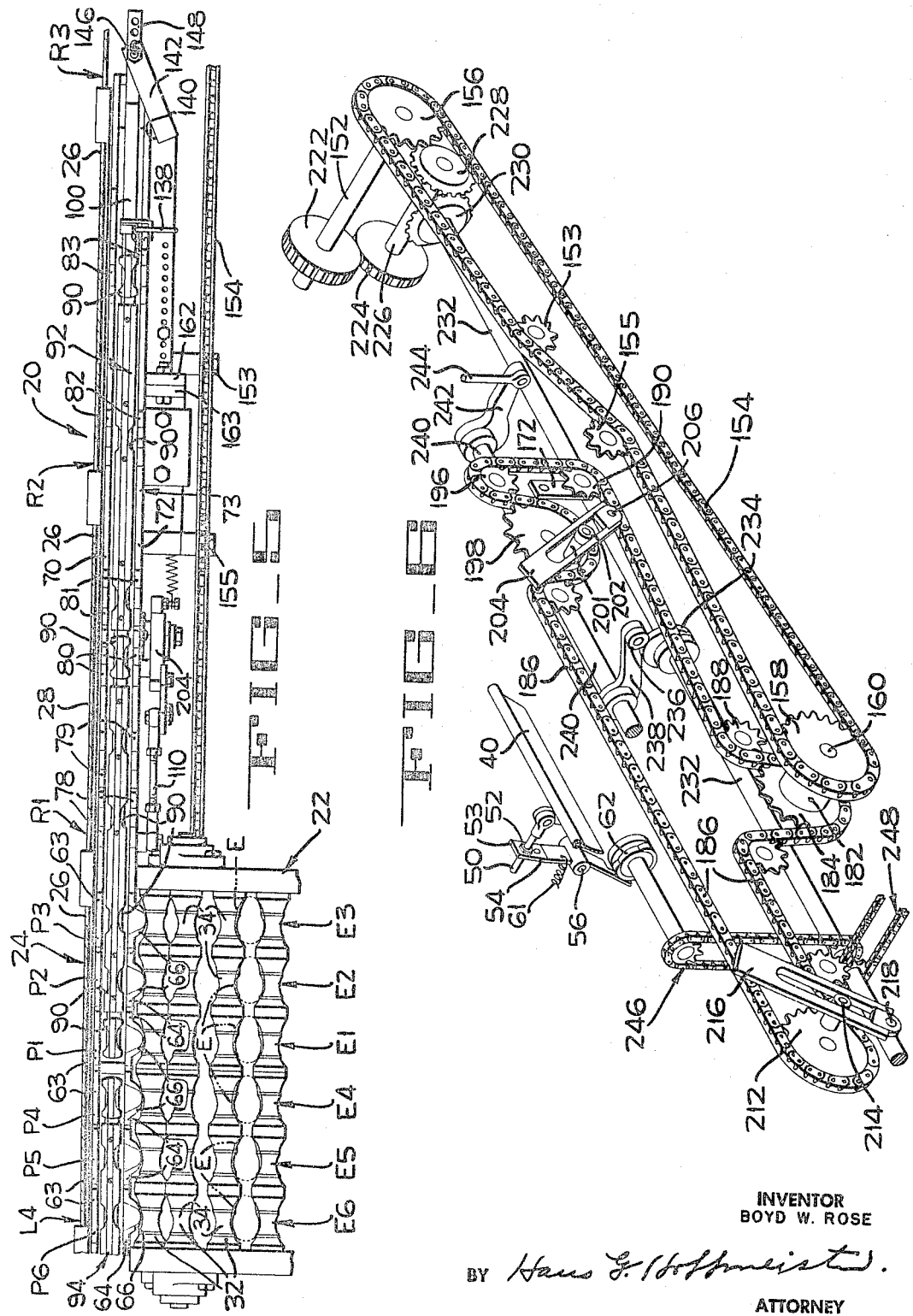

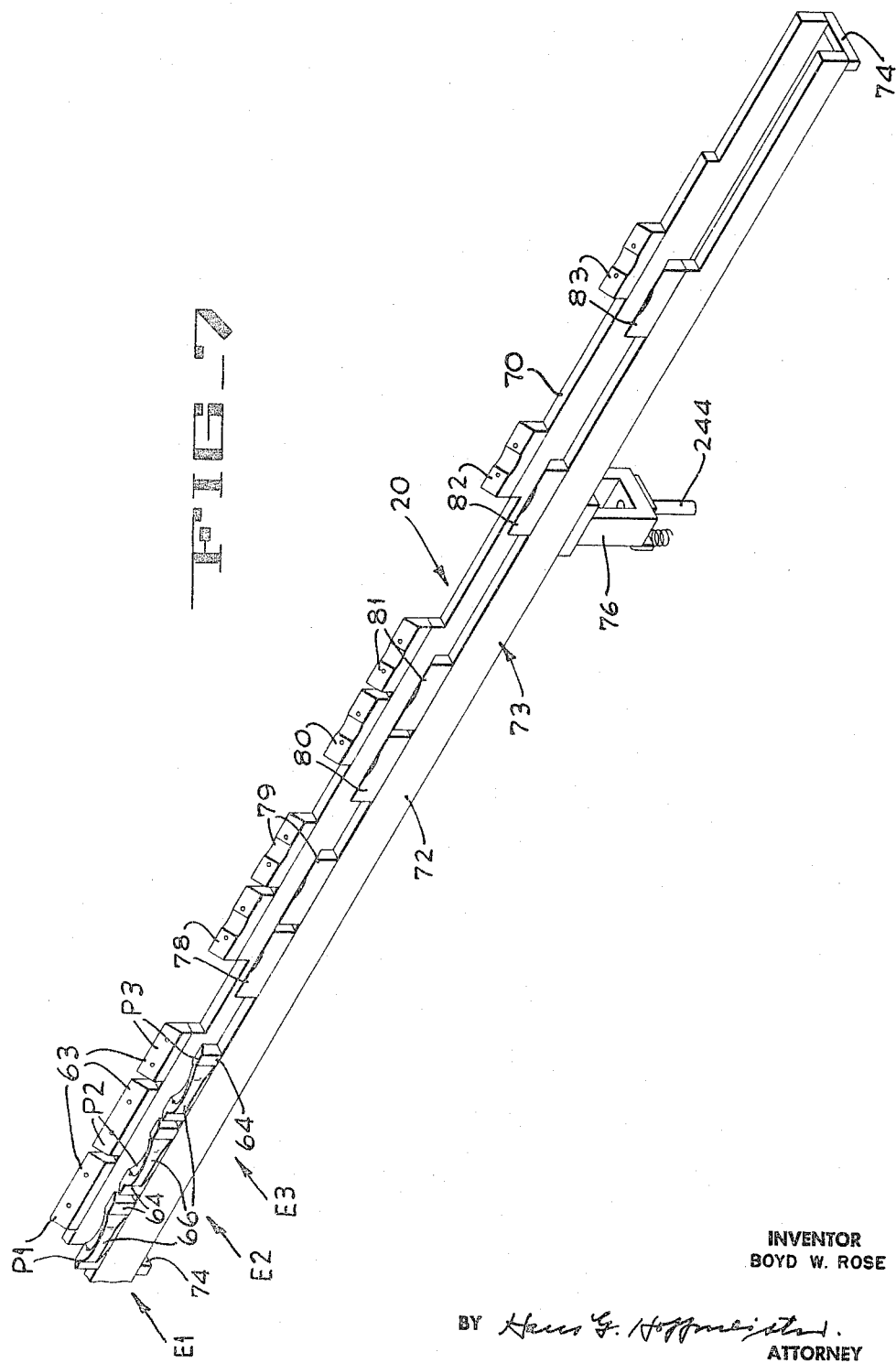

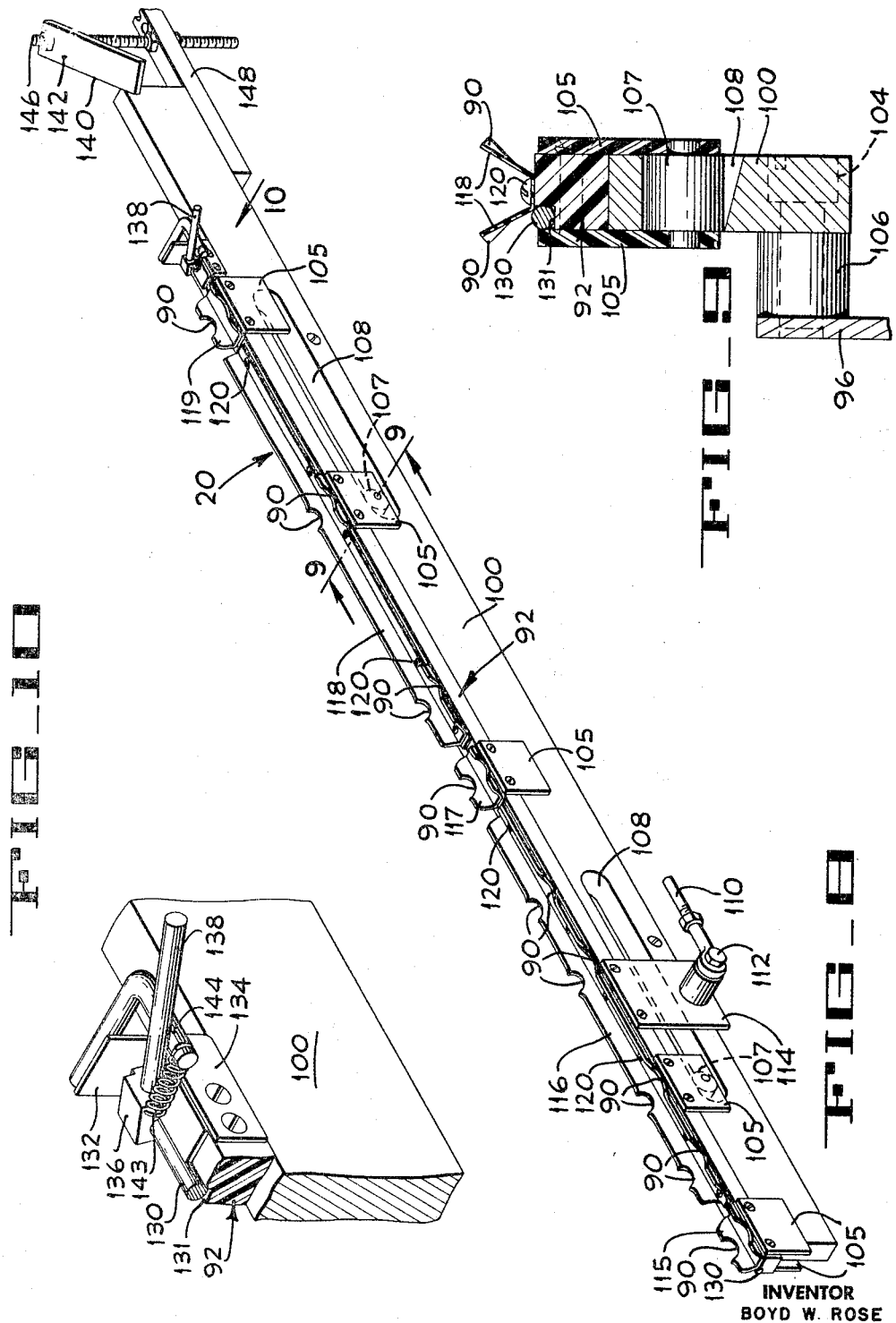

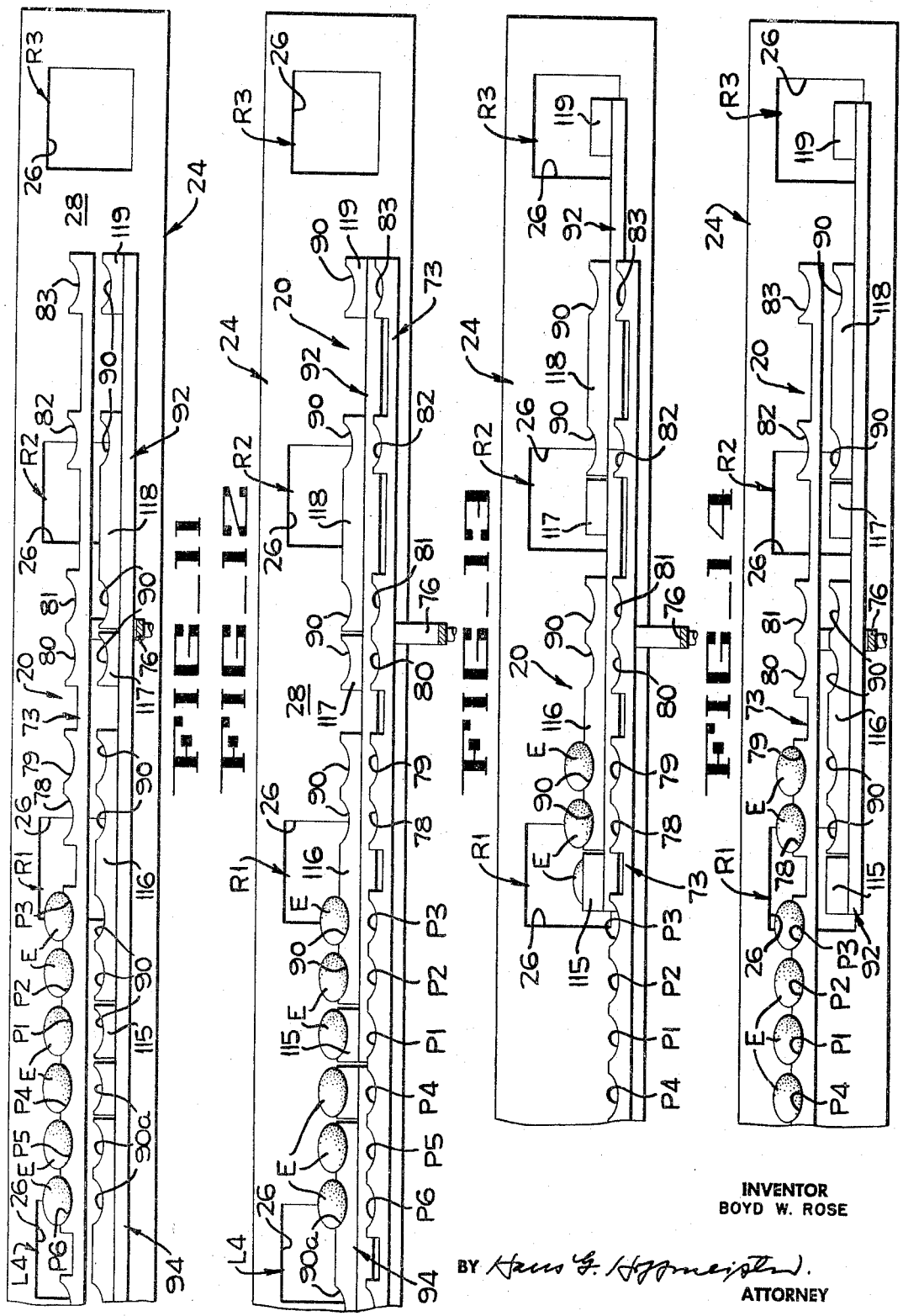

3,319,762
ARTICLE FEED MECHANISM
Boyd W. Rose, Riverside, Calif., assignor to FMC Corporation, San Jose, Calif., a corporation of Delaware
Filed Sept. 24, 1965, Ser. No. 489,921
9 Claims. (Cl. 198—32)

The present invention pertains to egg handling machines, and more particularly concerns an egg conveyor mechanism for distributing eggs to a plurality of processing stations adjacent the conveyor.

More specifically, the present invention concerns a shuttle type of feed mechanism which is particularly useful in an egg processing line for distributing the eggs to weighing or other stations which extend across the discharge end of a delivery conveyor feeding multiple lanes of eggs to the shuttle feed mechanism.

One of the objects of the present invention is to provide an improved feed mechanism which is adapted to convey eggs rapidly to plural processing stations.

Another object of the invention is to provide a feed mechanism arranged to receive an aligned row of eggs, divide the row into two groups of eggs, and to simultaneously convey the two groups in opposite directions.

Another object is to provide a feed conveyor achieving a relatively large output with a short and rapid operating stroke.

Another object is to provide a shuttle feed conveyor for distributing fragile articles from a continuously moving article delivery conveyor.

Another object is the provision of a shuttle feed conveyor especially adapted to handle very fragile articles such as eggs.

Other objects and advantages of the present invention will become apparent from the following description and the accompanying drawings wherein:

FIGURE 1 is a perspective of the shuttle feed mechanism of the present invention, and an associated delivery conveyor which feeds transverse rows of eggs to the shuttle feed mechanism for delivery to multiple weighing stations located alongside the shuttle feed.

FIGURE 2 is an elevation of the near half of the shuttle mechanism shown in FIGURE 1, the view being taken looking in the direction of arrows 2—2 of FIGURE 1 and the egg delivery conveyor and guard housings being omitted to illustrate parts otherwise concealed.

FIGURE 3 is a vertical transverse section, partly broken away, taken along lines 3—3 on FIGURE 2.

FIGURE 4 is a vertical transverse section partly broken away, taken along lines 4—4 on FIGURE 2.

FIGURE 5 is a fragmentary horizontal section taken along lines 5—5 on FIGURE 2, and including the egg delivery conveyor omitted from FIGURE 2, and certain corresponding feed pockets of the shuttle feed mechanism which are not shown in FIGURE 2.

FIGURE 6 is a schematic perspective of the drive train for the major portion of the shuttle feed mechanism illustrated in FIGURE 1.

FIGURE 7 is a perspective of approximately half the total length of the vertically reciprocable egg elevator which extends the full length of the FIGURE 1 shuttle feed mechanism.

FIGURE 8 is a perspective including a horizontally reciprocable egg carriage which extends only half of the length of the FIGURE 1 shuttle feed mechanism and cooperates with that half of the egg elevator shown in FIGURE 7 to move part of each group of incoming eggs along one conveying path. A similar transfer member moves the other eggs of the group in the opposite direction.

FIGURE 9 is a transverse vertical section taken along lines 9—9 on FIGURE 8.

FIGURE 10 is an enlarged fragmentary perspective of the area indicated generally by the arrow 10 at the right end portion of FIGURE 8.

FIGURES 11–14 are diagrammatic elevations illustrating part of the operating sequence of that half-portion of the shuttle feed mechanism which is shown in FIGURE 2.

Briefly, the shuttle feed mechanism 20 (FIG. 1) extends across the discharge end of an egg delivery conveyor 22, and alongside a plurality of egg discharge stations L4, L5, L6 located at the left of the incoming lanes E1–E6 of eggs E, and egg discharge stations R1, R2, R3 located at the right of the incoming lanes of eggs. The discharge stations are associated with individual egg weighing scales, not shown, that are mounted within an elongate scale housing 24.

The eggs E in the six longitudinally aligned lanes E1–E6 are in transverse alignment, and the function of the shuttle feed mechanism 20 is to receive successive transverse rows of six eggs from the delivery conveyor 22 and to distribute the eggs from lanes E1, E2 and E3 to the egg discharge stations R1, R2 and R3 respectively, and to distribute the eggs in lanes E4, E5 and E6 to the egg discharge stations L4, L5 and L6, respectively. At each discharge station, the eggs are automatically discharged through apertures 26 in the adjacent wall 28 of the scale housing 24, and come to rest upon scale platforms 30 (only two platforms being shown in FIGURE 1) that are associated with other egg handling apparatus. Because the shuttle feed mechanism is of substantially symmetrical construction at each side of the longitudinal centerline of the egg delivery conveyor 22, the following description, and the drawings to which it refers, are primarily directed to the mechanism associated with the egg discharge stations R1, R2 and R3 at the right half of the shuttle feed mechanism 20 shown in FIGURE 1.

More specifically, the egg delivery conveyor 22 (FIGS. 1, 3 and 5) is of the well-known spool type having spaced, driven spindles 32 which are provided with concave portions 34 of reduced diameter that cooperatively form pockets to support the eggs in supine positions between adjacent spindles as shown by the phantom line eggs of FIGURE 5. In the present instance, the egg delivery conveyor moves continuously in timed relation to the shuttle feed mechanism 20. Details of the egg delivery conveyor 22 are not critical to the proper operation of the shuttle feed mechanism 20, since other feed devices which will deliver successive rows of spaced eggs in horizontal positions will work equally well. A conveyor of this type is disclosed in the application for U.S. Letters Patent of Rose et al., Ser. No. 226,994 which is assigned to the assignee of the present invention. The disclosure of said application in regard to this conveyor and its drive is incorporated by reference herein.

The leading transverse row of six eggs is discharged from lanes E1–E6 at the approximate elevation of the four eggs shown in phantom line, from lanes E1–E4, shown in FIGURE 2. Such discharge is effected when the conveyor spindles 32 (FIG. 3) descend forwardly of their support sprockets 36, only one of which is shown, and the leading row of eggs becomes unsupported and rolls toward the shuttle feed mechanism 20.

At the time the row of eggs is thus released, they abut a Teflon bumper flap 40 which is hanging free and pivots in the direction of movement of the eggs to ease their transfer into individual, vertically movable feed pockets P1–P6 (FIG. 5) which respectively correspond to and are aligned with the incoming lanes of eggs E1–E6. At the time the eggs are fed into the feed pockets P1–P6, the pockets are in their uppermost position. The bumper flap 40 (FIGS. 2 and 3) is mounted on a pivot rod 44 which is rotatable in support brackets 46 that are fixed to the scale housing wall 28. A lever arm 48 is connected to one end portion of the flap 40 and has an actuating rod 50 pivoted thereto and projecting through an aperture in a cam lever 54. Locknuts 52 on the actuating rod 50 are arranged to be engaged by the upper end portion 53 of the cam lever 54 in order to positively retract the bumper flap 40 after the row of eggs has pushed the flap toward its FIGURE 3 position.

Thus, the bumper flap 40 initially hangs free in a generally upright position from its pivot rod 44, and while an incoming row of six eggs pushes the bumper flap toward the scale housing wall 28, it gently decelerates the eggs. After the eggs come to rest, the bumper flap 40 is mechanically retracted further to the left (FIG. 3) by the cam lever 54 clear of the eggs so that the eggs are free to move downstream toward their respective discharge stations. For this purpose, the cam lever 54 (FIGS. 3 and 6) is pivoted at 56 to a fixed frame member 58, and has a lower end portion 60 which is urged by a tension spring 61 to ride on the face of a crescent-shaped cam 62. The cam is rotated by a drive train (later described) so that when one row of six eggs is at rest in the feed pockets P1–P6, the upper end portion 53 of the cam lever 54 pushes the actuating rod 50 outward, thus retracting the bumper flap 40 from its former position abutting the row of eggs.

As shown in FIGURES 3, 5 and 7, each feed pocket P1–P6 is formed of two cooperating blocks 63 and 64, a preferred material for the blocks being a relatively soft polyvinylchloride plastic, or other resilient material. The blocks 63 and 64 have confronting and declining upper end surfaces, whereby pairs of the blocks provide a support cradle for an egg. Each block 64 is provided with an arcuate side wall portion 66 that projects toward the egg delivery conveyor 22. The particular utility of the projecting side wall portions 66 of the blocks 64 is due to the fact that they nest within the concavities of the adjacent spindles 32 in order to minimize the gap between the egg delivery conveyor 22 and the feed pockets P1–P6.

The feed pockets P1–P6 (FIGS. 3 and 7) are mounted on the upper surfaces of spaced bars 70 and 72 comprising an elevator assembly 73 that extends the entire length of the shuttle feed mechanism between the two most remote egg discharge stations L6 and R3 shown in FIGURE 1. Transverse cleats 74, and a support and drive yoke 76 are secured to the undersides of the bars 70 and 72 to respectively rigidify the elevator assembly 73 and to lift and lower the assembly in timed relation to the actuation of the bumper flap 40. This causes vertical movement of the feed pockets P1–P6 between the raised egg-receiving position shown in FIGURE 3 and a lower position, not shown, which will move each egg E from its FIGURE 4 solid line position to the lower dotted line position in the same figure. Another drive yoke 76, not shown, is provided for the other end portion of the elevator assembly 73. Both yokes 76, as later described, are driven in synchronism.

Also mounted on the elevator bars 70 and 72 (FIG. 7) are other spaced egg pockets 78–83 which are formed similar to the feed pockets P1–P6 and support eggs in a similar manner.

After one row of six eggs is transferred into the feed pockets P1–P6, both drive yokes 76 are lowered whereby the elevator assembly 73 descends and each egg is deposited into a horizontally movable transfer pocket 90 (FIG. 4) that is at that time positioned directly under the egg.

Interposed between the elevator side bars 70 and 72 (FIGS. 3 and 4) is a horizontally reciprocable egg transfer carriage 92 which supports the transfer pockets 90 at the right end portion of the shuttle feed mechanism 20. A similar egg transfer carriage 94 (FIG. 5) is mounted between the elevator bars 70 and 72 at the left end portion of the machine, and the drive arrangement for the carriages 92 and 94 is such that they move synchronously, but in opposite directions. The carriages 92 and 94 are formed of convas base Bakelite, which has a low coefficient of friction, and is relatively strong. Support means for both carriage 92 and 94 (FIGS. 2–4) includes an elongate plate 96 which is secured by bolts 98 to the scale housing wall 28. Fixed rails 100 and 102 are held in spaced relation to the plate 96 by bolts 104 and spacers 106. The rail 100 supports the carriage 92, and the rail 102 supports the carriage 94.

The carriage 92 carries five pairs of aligned Bakelite side plates 105 (FIGS. 8 and 9), and two of the five pairs of plates support rollers 107 therebetween. The rollers 107 are disposed in slots 108 in the rail 100 and prevent the carriage 92 from lifting from the rail 100 when it is being driven longitudinally of the rail. The bottom walls of the slots 108 are inclined (FIG. 9) so that debris cannot lodge in the slots and cause the rollers 107 to become jammed. Driving power to horizontally reciprocate the carriage 92 on its support rail 100 is applied through an actuating rod 110 that has a pivotal connection at 112 to a plate 114 that is bolted to one side of the carriage 92. The pivotal connection is made through a conventional ball joint connector threaded onto the rod 110, and a bolt which locks the ball joint to the plate 114 but does not inhibit pivotal movement of the rod.

Mounted on the upper surface of the carriage 92 (FIG. 8) are transversely V-shaped pocket members 115–119. These members each have outwardly splayed and arcuately recessed portions that define the egg transfer pockets 90 which horizontally reciprocate as the carriage 92 moves between the positions shown in FIGURES 11 and 14. The spacing between the transfer pockets 90 on the carriage 92 is the same as the spacing between the egg cradles or pockets P1–P3 and 78–83 as shown in FIGURE 11 so that the egg pockets of the elevator assembly 73 and the carriage 92 are vertically aligned when the carriage 92 is fully retracted toward the egg delivery conveyor 22. The elongate pocket members 116 and 118, having the multiple egg transfer pockets 90, are fixed to the carriage 92 by screws 120 (FIG. 9), and the short, single pocket members 115, 117 and 119 are tiltably mounted on the carriage 92 for automatic discharge of the eggs therein when the carriage 92 is at its limit of movement away from the egg delivery conveyor 22. At this limit of movement the tilting pocket members 115, 117 and 119 are disposed at the FIGURE 1 egg discharge stations R1, R2 and R3, respectively.

For effecting the automatic dumping operation, the tilting pocket members 115, 117 and 119 (FIGS. 8–10) are welded to a rotatable rod 130 that rests in a recess 131 in the upper edge portion of the carriage 92 and extends under the adjacent corner portions of the fixed pocket members 116 and 118, and beside the adjacent side plates 105. Adjacent the farthest downstream single tiltable pocket member 119, the end of the rod 130 (FIG. 10) is rotatably mounted in the upright flange 132 of a bracket 134 which is secured to the carriage 92. Upstream of the flange 132, a block 136 is secured to the rod 130. Integral with the block 136 is an actuating arm 138 which, when the pocket members 115, 117 and 119 are not tilted, inclines upward and outward from the block 136 in a position in which it will abut and be lifted by the camming edge 140 of a fixed horizontal plate 142 (FIG. 8) when the carriage 92 approaches its downstream limit of movement. A tension spring 143 is connected to the block 136 and to an arm 144 which is secured to the flange 132 so that the tiltable egg pocket members 115, 117 and 119 are retained in their common upright position until the actuating arm 138 is lifted by the camming edge 140. The plate 142 is supported by a bolt 146 which allows adjustable swinging movement of the plate in a horizontal plane and can be positioned in a selected aperture in a strap 148 that is secured to the fixed rail 100.

Because, at the end of the downstream stroke of the carriage 92, the tiltable egg pocket members 115, 117 and 119 are respectively aligned with the egg discharge stations R1, R2 and R3, the tilted pockets discharge an egg onto each scale platform 30 (FIG. 1). At the same time, the other egg discharge stations L4, L5 and L6 receive eggs in the same manner by their corresponding tiltable cups, not shown.

Driving power for the shuttle feed mechanism 20 is supplied by a motor, not shown, which continuously rotates a driveshaft 152 (FIG. 6). A primary drive chain 154 is trained around a drive sprocket 156 on the driveshaft 152, over idler sprockets 153 and 155, and around a driven sprocket 158 that is mounted on a stub shaft 160 (FIG. 3). The stub shaft 160 is secured to suitable support members within the scale housing 24. The idler sprocket 153 (FIGS. 2 and 5) is mounted on a plate 162 that is vertically adjustable relative to a vertical member 163 on a bracket 164 which is fixed to the mounting plate 96 by means of an angle bar 166. The idler sprocket 155 is mounted on a leg 168 of the bracket 164. Pivoted at 170 (FIG. 2) to the leg 168 is a depending arm 172 which carries another idler sprocket for another drive train next described. The driven sprocket 158 (FIG. 6) is coupled by a hub 182 to an adjacent sprocket 184, the purpose of which is to provide the power which effects simultaneous, opposite movement of the horizontally reciprocable carriages 92 and 94 (FIG. 5) that respectively deliver eggs to the egg discharge stations R1–R3 and L4–L6. An endless chain 186 is trained around the sprocket 184, over a fixed idler sprocket 188, and around a movable idler sprocket 190 that is carried by the previously mentioned pivoted arm 172. A tension spring 192 (FIG. 2) urges the movable idler sprocket 190 in a direction away from the sprocket 184 (FIG. 6) to resiliently tension the interposed flight of the chain 186, the slack condition of which is controlled by a stop bolt 194 (FIG. 2) which abuts the pivoted arm 172.

From the idler sprocket 190 (FIG. 6) the chain 186 extends upward over a fixed idler sprocket 196 and around a large drive sprocket 198 that is rotatably mounted on a stub shaft 200 (FIG. 3). A disc 199 is secured to the outer face of the sprocket 198. Projecting outward from the disc 199 (FIGS. 2, 3 and 6) and radially displaced from the turning axis of the sprocket, is a stud 201 carrying a cam roller 202 which provides an eccentric drive connection to a swing lever 204. Lever 204 is provided with an elongate slot, one wall of which is held in contact with the roller 202 by means of a tension spring 203 that is connected to the lower end portion of the lever 204. Intermediate its length, the lever 204 has an enlarged bearing portion 205 (FIG. 3) which is pivoted at 206 to an outwardly projecting, bifurcated bracket 208 that is mounted on plate 96. Near its upper end, the lever 204 is slotted to receive a bolt 210. The bolt 210 locks a conventional ball joint end connector in a slotted portion of the swing lever 204, and the ball joint is threaded onto the actuating rod 110. The carriage 92 is thus reciprocated when the swing lever 204 is oscillated by its eccentrically mounted drive roller 202. By means of the ball joint connectors threaded onto the rod 110, its length can be adjusted to regulate the timing; the length of the carriage stroke is governed by the adjusted position of the bolt 210 along its mounting slot in the swing lever 204.

The same chain 186 which drives the swing arm 204 has an upper flight extending toward the other end of the machine and around a large sprocket 212 which is the counterpart of the sprocket 198 and horizontally reciprocates the carriage 94 which feeds eggs to the discharge stations L4–L6. Thus, the sprocket 212 drives an eccentrically mounted cam roller 214 which is in driving engagement with a swing arm 216 that is pivoted at 218. The swing arm 216 is in opposite phase relation to the swing arm 204 so that their respective carriages 94 and 92 move in opposite directions and half of each incoming group of eggs is conveyed away from each side of the egg delivery conveyor 22.

Returning to the power input shaft 152 (FIG. 6), a spur gear 222 on said shaft is meshed with a spur gear 224 on a shaft 226. Also mounted on shaft 226 is a bevel gear 228 that is meshed with a bevel gear 230 on a shaft 232 which extends substantially the entire length of the machine. Shaft 232 provides power to vertically reciprocate the elevator assembly 73 (FIG. 7), to actuate the bumper flap 40, and to drive the egg delivery conveyor 22. The elevator drive includes a face cam 234 which is mounted on the shaft 232 and is engaged by the cam roller 236 of an arm 238. Arm 238 is keyed to a rockshaft 240 which, at the right hand end portion of the machine, is keyed to a lever 242. The rockshaft 240 also extends to a similar point at the left hand end portion of the machine and is keyed to another lever 242, not shown. Each lever 242 is pivoted to a linearly adjustable, upstanding rod 244 which, as is typically shown in FIGURES 2 and 7, lies under and is connected to the elevator drive yoke 76.

Timing of the elevator assembly 73 relative to the carriage drives is such that (beginning with an operating cycle in which the elevator assembly 73 is up and the carriages 92 and 94 are adjacent one another) the elevator descends, the carriages move apart, the elevator rises, and the carriages return to their initial positions. As was indicated earlier, the bumper flap 40 is retracted just prior to downstream movement of the carriages 92 and 94. This retracting movement is effected by a chain drive train 246 that rotates the previously mentioned cam 62. A chain drive train 248 is coupled to the shaft 232 to appropriately time and drive the egg delivery conveyor 22.

One full operating cycle of the shuttle feed mechanism 20 is schematically shown in FIGURES 11–14. Beginning with the same operating cycle conditions outlined above, a row of six eggs E (FIG. 11) is discharged from the egg delivery conveyor 22 into the feed pockets P1–P6 on the elevator 73 when the elevator is in its "up" position. The feed pockets P1–P3 lie in vertical alignment with the first three egg pockets 90 on the carriage 92, and the feed pockets P4–P6 are similarly aligned with the first three egg pockets 90a on the carriage 94. Both carriages are at rest.

While the carriages 92 and 94 (FIG. 11) remain at rest, the elevator assembly 73 is lowered until the feed pockets P1–P6 no longer support the eggs and the entire row of six eggs is deposited in the previously subjacent egg pockets 90 and 90a (FIG. 12).

Next, and while the elevator assembly 73 is at rest in its lowermost FIGURE 13 position, the carriage 92 is moved horizontally until the tilting pocket member 115 which carries the egg which was transferred from the feed pocket P1 is opposite the discharge station R1. As previously described in connection with FIGURES 8 and 10, this is the limit of downstream movement of the carriage 92, and the pocket members 115, 117 and 119 automatically tilt at this limit to their discharge positions. The egg from the feed pocket P1 is thus delivered onto its scale platform, and if other eggs had been present in the other tilting pocket members 117 and 119, they would have been respectively discharged onto their scale platforms adjacent the discharge stations R2 and R3. It will be apparent that a similar egg discharge operation is carried out at the same time by the other carriage 94, i.e., the egg from the feed pocket P4 was delivered to the scale associated with the egg discharge station L4.

Without the carriage 92 moving from its FIGURE 13 position (the carriage 94 also being idle) the elevator assembly 73 (FIG. 14) is moved to its "up" position whereby the feed pockets P1–P6 are once more in egg receiving position and a new group of eggs is delivered thereto from the delivery conveyor 22. Also, the remaining two eggs of the original three eggs moved by the carriage 92 are by the foregoing upward movement of the elevator transferred into pockets 78 and 79 which are downstream from the initial pockets P2 and P3 a distance equal to the stroke of the carriage 92. Following the "up" movement of the elevator, the carriage 92 is returned to its FIGURE 11 position, and the described cycle is repeated.

The P1 pocket eggs from lane E1 will always be discharged at the discharge station R1 because the length of the stroke of the carriage 92 is equal to the distance between the feed pocket P1 and the discharge station R1. Eggs in the feed pockets P2 and P3 are always delivered to the discharge stations R2 and R3, respectively, because the discharge stations are each spaced from their feed pockets P2 and P3 a multiple of the length of the stroke of the carriage 92. Similarly, one downstream stroke of the carriage places the tiltable pocket members 115, 117 and 119 in respecive alignment with the discharge stations R1, R2 and R3, and the various cradles and pockets corresponding to a given egg are spaced apart the length of the carriage stroke.

It will be evident from the foregoing description that the shuttle feed mechanism 20 is capable of rapidly, but gently, distributing eggs to the discharge stations R1–R3 and L4–L6 because the incoming groups of eggs are divided and conveyed in opposite directions. Thus, the operating strokes of the carriages 92 and 94 can be, and are, made relatively short so that a high output of eggs distributed to the discharge stations is achieved without abrupt movements which could damage the eggs.

While a particular embodiment of the shuttle feed mechanism of the present invention has been herein shown and described, it will be apparent that modification and variation may be made without departing from the spirit of the invention, and that the scope of the invention should be limited only by proper interpretation of the claims appended hereto.

Having thus described the invention, that which is believed to be new, and for which protection by Letters Patent is desired is:

1. An egg distributing mechanism comprising means defining a row of spaced egg cradles, means mounting said cradles for simultaneous vertical movement between upper and lower positions, means providing a row of spaced egg pockets, means mounting said pockets for simultaneous horizontal movement between upstream and downstream positions, said cradles and said pockets having individual upwardly facing egg support surfaces, the support surfaces of one of said rows horizontally straddling the support surfaces of the other of said rows when said pockets are in said upstream and downstream positions, means for feeding a plurality of eggs into predetermined cradles when said cradles are in said upper position, and power means connected to said cradle and pocket mounting means for sequentially lowering said cradles when said pockets are in said upstream position to transfer the eggs from said cradles to said pockets, moving said pockets and the eggs therein to said downstream position, and raising said cradles until the eggs are transferred from the pockets to cradles downstream of said predetermined cradles.

2. An egg distributing mechanism comprising means defining a row of spaced egg cradles, means mounting said cradles for simultaneous vertical movement between upper and lower positions, means providing a row of spaced egg pockets, means mounting said pockets for simultaneous horizontal movement between upstream and downstream positions, said cradles and said pockets having individual upwardly facing egg support surfaces, the support surfaces of one of said rows horizontally straddling the support surfaces of the other of said rows when said pockets are in said upstream and downstream positions, means for feeding a plurality of eggs into predetermined cradles when said cradles are in said upper position, means for discharging eggs from predetermined pockets when said pockets are in said downstream position, and power means connected to said cradle and pocket mounting means for sequentially lowering said cradles when said pockets are in said upstream position to transfer the eggs from said cradles to said pockets, moving said pockets and the eggs therein to said downstream position in order to discharge the eggs from said predetermined pockets, and raising said cradles until the remaining eggs are transferred from the pockets to cradles downstream of said predetermined cradles.

3. An egg distributing mechanism comprising means providing a row of spaced egg cradles, means mounting said cradles for simultaneous vertical movement between upper and lower positions, means providing two separate rows of spaced egg pockets in end to end alignment adjacent said cradles, the rows of pockets being arranged for simultaneous horizontal movement in opposite directions between upstream and downstream positions respectively toward and away from each other, each of said cradles and pockets having upwardly facing egg support surfaces, the support surfaces of said cradles being arranged to horizontally straddle the support surfaces of said pockets when said pockets are in said upstream and downstream positions, means for feeding a plurality of eggs into predetermined cradles when said cradles are in said upper position, and power means connected to said cradle and pocket mounting means for sequentially lowering said cradles when the two rows of said pockets are in said upstream position to transfer the eggs from said cradles to said pockets, moving each row of pockets and the eggs therein to said downstream position, and raising said cradles whereby the eggs are transferred from the pockets to the cradles downstream of said predetermined cradles.

4. A shuttle feed mechanism for distributing eggs comprising means providing a plurality of spaced cradles, means mounting said cradles for conjoint vertical movement between upper and lower positions, each of said cradles having a central opening and upwardly facing egg support surfaces, a plurality of spaced egg transfer pockets, means mounting said pockets for conjoint horizontal movement between upstream and downstream positions, said transfer pockets having the same interspacing as said egg support cradles and being vertically aligned with the openings in said cradles when said transfer pockets are in either said upstream or said downstream position, each of said transfer pockets having upwardly facing egg support surfaces which are spaced from the undersurface of an egg supported in an aligned cradle when the cradle is in said upper position and in supporting relation with the undersurface of the egg when the cradle is in said lower position, means for delivering an egg to a predetermined cradle when the cradles are in said upper position, and power drive means connected to said cradle and to said transfer pocket mounting means to sequentially move said cradles from said upper position to said lower position so that the eggs supported by said cradles are deposited in said transfer pockets, move said transfer pockets to said downstream position while said cradles are in said lower position, and move said cradles to said upper position while said transfer pockets are in said downstream position, whereby the egg initially supported by said predetermined cradle is shuttled to a different cradle downstream of said predetermined cradle.

5. A shuttle feed mechanism for distributing eggs comprising a plurality of spaced cradles, means mounting said cradles for conjoint vertical movement between upper and lower positions, each of said cradles having a central opening and upwardly facing egg support surfaces, a plurality of spaced egg transfer pockets, means mounting said pockets for conjoint horizontal movement between upstream and downstream positions, said transfer pockets having the same interspacing as said egg support cradles and being vertically aligned with the openings in said cradles when said transfer pockets are in said upstream and downstream positions, each of said transfer pockets having upwardly facing egg support surfaces which are spaced from the undersurface of an egg supported in an aligned cradle when the cradle is in said upper position, the support surfaces of said pockets being in supporting relation with the undersurface of the egg when the cradle is in said lower position, means for delivering an egg to a predetermined cradle when the cradles are in said upper position, and power drive means connected to said cradle mounting means and to said transfer pocket mounting means to sequentially move said cradles from said upper position to said lower position so that the eggs supported by said cradles are deposited in said transfer pockets, move said transfer pockets to said downstream position while said cradles are in said lower position, move said cradles to said upper position while said transfer pockets in said downstream position, and move said transfer pockets to said upstream position while said cradles are in said upper position and said egg delivery means delivers another egg to said predetermined cradle.

6. Apparatus according to claim 4 wherein dual assemblies of transfer pockets having individual mounting means are provided, said egg delivery means simultaneously feeding an egg into adjacent cradles associated with each assembly of transfer pockets, said power drive means repetitively actuating both of said transfer pocket mounting means in synchronism and in opposite directions whereby the incoming eggs are divided and shuttled from cradle to cradle in opposite directions.

7. Apparatus according to claim 4 and further including means tiltably mounting one of said transfer pockets for movement between an egg supporting and an egg discharging position, and means operable when said transfer pockets are in said downstream position for tilting said one pocket to egg discharging position.

8. Apparatus according to claim 4 and further including means mounting a plurality of said transfer pockets for tilting movement between an egg supporting and an egg discharging position, means operable when said transfer pockets are in said downstream position for moving said tiltable transfer pockets to egg discharging position, a plurality of discharge stations spaced from the initial delivery points of said eggs by distances equal to an even multiple of the distance travelled by said transfer pockets between said upstream and downstream positions, and wherein each incremental movement of an egg between said cradles corresponds to an even fraction of the distance between said initial delivery points and said discharge stations.

9. Egg distributing mechanism comprising a frame, means defining a discharge aperture on said frame, a carriage means mounting said carriage for horizontal reciprocating movement adjacent said aperture between upstream and downstream positions, a plurality of egg transfer pockets mounted on said carriage, means mounting a downstream one of said pockets for tilting movement, means for tilting said pocket when said carriage is in said downstream position, means for feeding an egg into a pocket upstream of said tiltable pocket when said carriage is in said upstream position, said egg and its pocket in such position being spaced from said discharge aperture an even multiple of the distance between said upstream and downstream positions, power drive means for reciprocating said carriage, and means operative each time the carriage is moved upstream for moving the egg to a downstream pocket spaced from the former pocket by a distance equal to the stroke of the carriage, whereby the egg is eventually shuttled into said tiltable pocket and is discharged from the pocket through said aperture upon completion of the next following stroke of the carriage.

References Cited by the Examiner
UNITED STATES PATENTS 1,741,516  12/1929  Hansen _____ 198—219

FOREIGN PATENTS 150,408  3/1964  U.S.S.R.

References Cited by the Applicant
UNITED STATES PATENTS 1,880,112  9/1932  Shmyroff et al.
2,246,597  6/1941  Niederer et al.
2,381,035  8/1945  Campbell et al.
2,646,168  7/1953  Niederer et al.
2,661,715  12/1953  McLean.
3,002,620  10/1961  Marzoff.
3,148,761  9/1964  Niederer et al.

EVON C. BLUNK, *Primary Examiner.*

E. A. SROKA, *Assistant Examiner.*